Patented June 1, 1948

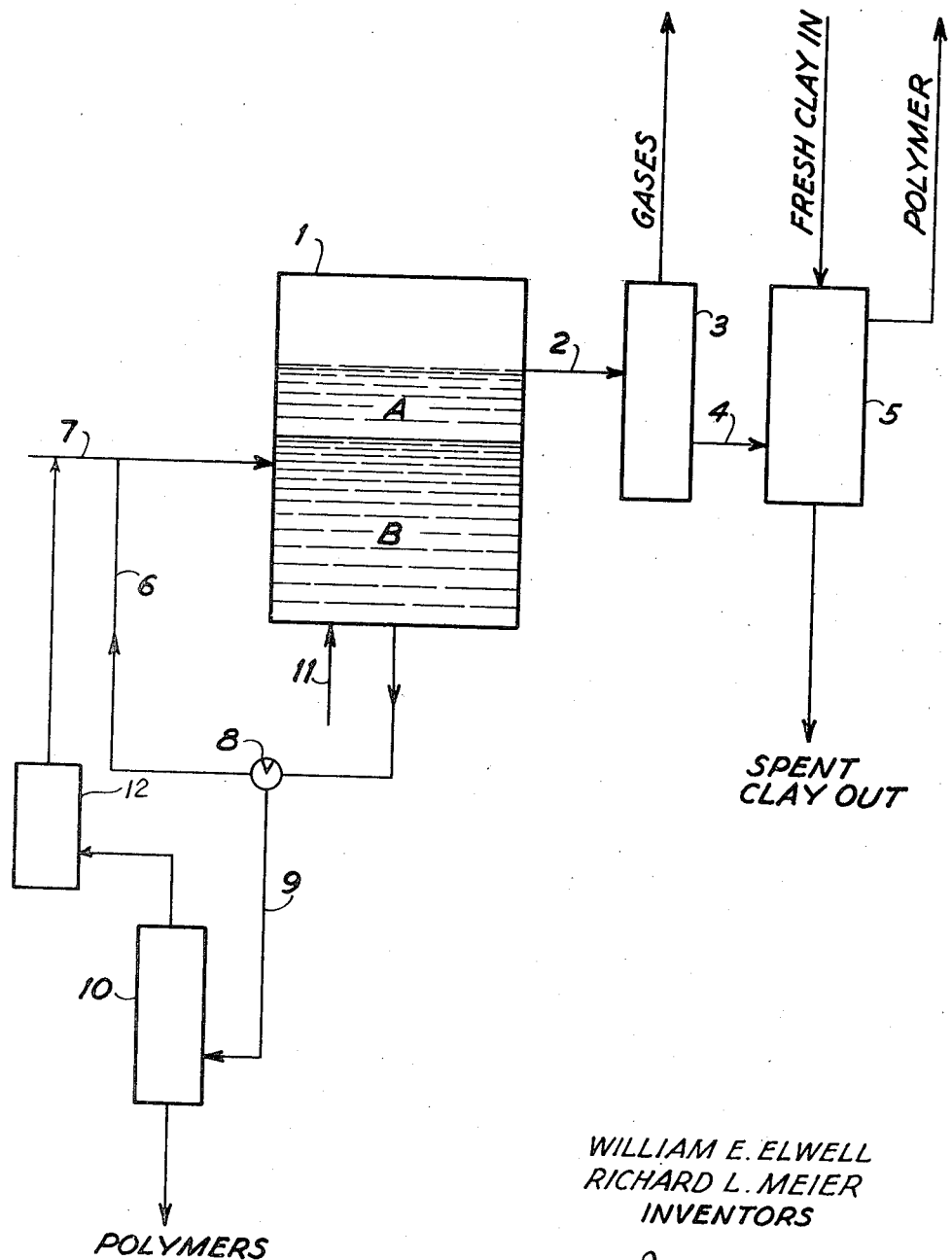

2,442,645

UNITED STATES PATENT OFFICE 2,442,645

POLYMERIZATION OF UNSATURATED HYDROCARBONS

William E. Elwell and Richard L. Meier, Berkeley, Calif., assignors to California Research Corporation, San Francisco, Calif., a corporation of Delaware Application April 2, 1946, Serial No. 659,025

13 Claims. (Cl. 260—683.15)

The present invention relates to the process of polymerizing unsaturated hydrocarbons dissolved in liquid sulfur dioxide in the presence of boron fluoride catalyst, and more particularly to the polymerization of normal lower mono-olefins dissolved in liquid sulfur dioxide in the presence of boron fluoride catalyst.

In our copending applications entitled "Process of activating polymerization cf hydrocarbons" and "Method of controlling viscosity of hydrocarbon polymers," respectively, and filed of even date herewith, we disclosed liquid sulfur dioxide in a minor proportion as an activator and as a molecular-chain regulator or terminator in the polymerization of olefins with boron fluoride catalyst.

We have discovered that liquid sulfur dioxide in a major proportion possesses an additional significant advantage as a solvent for the monomers in the aforementioned polymerization and offers other important advantages which will become apparent from the description given hereinafter.

Ordinarily oxygen- and nitrogen-containing solvents are unsuited for acid-catalyzed polymerization of the olefins, since they coordinate with the catalyst in preference to the double bond of the olefin, and thus forestall the catalysis of the polymerization reaction.

Liquid sulfur dioxide is known to coordinate with various acid-acting salts, such as aluminum chloride, titanium tetrachloride, stannic chloride, and the like. Practically all of the molecular compounds formed by this coordination of sulfur dioxide are stable at or above the boiling point of sulfur dioxide (—10° C.) and thus prevent the catalysis of polymerization by these salts in the presence of sulfur dioxide. As pointed out hereinafter, however, these complexes dissociate at higher temperatures and superatmospheric pressure sufficient to prevent boiling off of the sulfur dioxide solvent.

Our process, which resorts to the use of liquid sulfur dioxide as a solvent in the polymerization of olefins with boron fluoride catalyst, represents a remarkable exception to the general rule. Liquid sulfur dioxide coordinates with boron fluoride and forms a molecular compound of the formula $BF_3.SO_2$. However, this latter compound is sufficiently unstable to dissociate at a temperature of as low as —100° C., releasing thereby an adequate proportion of free boron fluoride catalyst molecules to effect the polymerization of olefins.

It has been observed that liquid sulfur dioxide readily dissolves lower olefins, but loses its solvent power as the molecular weight increases. Therefore, while lower olefins containing up to 5 carbon atoms readily dissolve in said liquid sulfur dioxide, higher olefins, particularly those containing more than 10 carbon atoms, are insoluble therein. Consequently, the higher olefin polymers formed in the process of this invention by contact of olefin monomers dissolved in liquid sulfur dioxide with boron fluoride catalyst, become insoluble in said sulfur dioxide and emerge as an oil phase above the solution.

This formation of a separate oil phase provides new important and unexpected results heretofore unkown in the art. One such advantageous result of our process employing liquid sulfur dioxide as a solvent in the polymerization of olefins with boron fluoride catalyst consists in the rather narrow molecular weight range of polymeric products formed in such process, which circumstance insures a substantially pure product and dispenses with the requirements of fractionation to obtain the desired hydrocarbon cuts, as is ordinarily necessary in the heretofore known processes.

At atmospheric pressure the process is operative within the range of temperatures from about —100° C. to about —10° C. Higher temperatures may be used with pressures above the atmospheric. Whenever required, inert diluents may be present to dilute the monomers for the polymerization, provided their presence would not cause a premature separation of two phases before the polymerization takes place.

While the process of our invention is preferably applicable to the polymerization of lower normal mono-olefins dissolved in liquid sulfur dioxide in the presence of boron fluoride catalyst, isobutylene dissolved in liquid sulfur dioxide is found to be capable of polymerization in accordance with our present process not only in the presence of boron fluoride, but also in the presence of the acid-acting metal halide salts, such as aluminum chloride, titanium tetrachloride, and the like.

It is contemplated that the acid-acting salts effective in the aforementioned polymerization of isobutylene may be rendered effective as catalysts for the polymerization of normal mono-olefins, such as propylene, provided that the reaction is carried out at temperatures higher than those corresponding to the dissociation temperatures of their respective molecular compounds, and that the boiling off of the sulfur dioxide solvent is prevented or regulated by the application of appropriate pressures.

The functioning of the process may be best understood by reference to the appended diagram which shows, in substance, reactor 1 containing the two phases: the oily polymer phase A and the liquid sulfur dioxide phase B which contains the reaction mixture. The olefin monomers and the liquid sulfur dioxide solvent may be introduced into the reactor through line 7, the catalyst being admitted through line 11, as shown in the diagram, and the oily polymer separates in the polymer phase. On leaving the reactor the polymer is sent through line 2 to a stripper 3, where it is freed from any sulfur dioxide and/or boron fluoride which may be still present therein, and finally the product enters through line 4 into a clay treater 5 to be purified of color bodies and other impurities. Gaseous boron fluoride on leaving stripper 3 may be separated from other admixtures and returned to line 11.

The remaining sulfur dioxide solution may be recycled from the bottom of reactor 1 through line 6 into line 7 which feeds the monomers and the fresh sulfur dioxide into the reactor. Should any soluble polymers, such as olefin dimers or trimers, accumulate in the liquid sulfur dioxide phase to a higher concentration than may be desired for the efficient operation of the process, they may be eliminated, either in a continuous or in an intermittent manner, by withdrawing the solution through a by-pass valve 8 and line 9 into a still 10 where they are separated from sulfur dioxide, boron fluoride, and other light gaseous constituents. If desired, gaseous sulfur dioxide is freed from other admixtures in a suitable purification and condensation apparatus 12 and recycled to line 7.

The following examples serve to further illustrate the principles and the operativeness of the process, as well as to emphasize its novelty. All of the tests are carried out in Pyrex-glass cells equipped with suitable inlets and outlets and provided with a dry-ice condenser. The test equipment is preferably blackened out to prevent the effect of undesirable light-catalyzed polymerization in which case polysulfones of the respective olefins are likely to be formed. This precaution and the fact that the process is carried out at the reflux temperature of sulfur dioxide, i. e., at about $-10°$ C., which is much lower than the corresponding floor temperatures necessary for the formation of polysulfones, forestall the presence of these latter in the polymerization product.

*Example 1.*—This is a typical example of our process. 250 cc. of propylene and 250 cc. of liquid sulfur dioxide are charged into the reaction cell, and the catalyst gas composed of 63% of boron fluoride and 37% of nitrogen is fed into the mixture for 4 hours at the rate of 100 cc. per minute. After 55 minutes the reaction is completed, and the separation of two distinct phases may be observed. The upper phase consists almost entirely of hydrocarbon polymer in a 64% yield. The polymer has the following characteristics:

| | |
|---|---|
| Specific gravity at 60° F. | .8353 |
| Viscosity S. S. U. at 100° F. | 85.2 |
| Viscosity S. S. U. at 210° F. | 37.3 |
| Refractive index | 1.4633 |
| Molecular weight | Approximately 400 |
| Viscosity index | 61 |
| Sulfur content | 0.1% |

This latter value clearly indicates that the formation of polysulfones is negligible.

*Example 2.*—This example is given to show that the occurrence of polymerization of lower normal mono-olefins dissolved in liquid sulfur dioxide in the presence of boron fluoride catalyst is a unique phenomenon as compared with the employment of other acid catalysts. 30 g. of aluminum chloride is dissolved in 250 cc. of sulfur dioxide, and propylene is fed into the mixture. No reaction is observed.

*Example 3.*—The next test is carried out with isobutylene to show the feasibility of its polymerization within the range of the operative temperatures of the present process, i. e., between the temperature of dissociation of the $BF_3SO_2$ molecular compound (about $-100°$ C.) and the boiling point of sulfur dioxide ($-10°$ C.).

200 cc. of isobutene is dissolved in 200 cc. of liquid sulfur dioxide, whereupon the gaseous catalyst with a composition of 25% boron fluoride and 75% of nitrogen is admitted into the solution. A rapid reaction is observed and two distinct phases separate. The upper phase consists substantially of a hydrocarbon polymer in a 90% yield. This polymer has the following characteristics:

| | |
|---|---|
| Specific gravity at 60° F. | .8883 |
| Viscosity S. S. U. at 100° F. | 8490 |
| Viscosity S. S. U. at 210° F. | 1194.5 |
| Viscosity index | 119 |
| Molecular weight | Approximately 900 |

*Example 4.*—This test confirms the fact that isobutylene polymerizes more readily than normal olefins; it is highly sensitive not only towards boron fluoride catalyst, but to aluminum chloride catalyst as well, and a small amount of the latter is effective to polymerize isobutylene. On dissolving 30 g. of aluminum chloride in 300 cc. of $SO_2$, isobutene is slowly introduced into the mixture. A white rubbery isobutene polymer with a viscosity of 40,868 S. S. U. at 210° F. is formed rapidly.

*Example 5.*—This test points out that no reaction occurs at temperatures lower than that required for the dissociation of $BF_3.SO_2$ molecular compound, namely, lower than about $-100°$ C. 50 cc. of propylene, 10 cc. of sulfur dioxide and 150 cc. of methane diluent, as well as about 20 g. of boron fluoride, are introduced into a transparent vacuum-jacketed Pyrex jar and held at reflux under a liquid nitrogen condenser at a temperature of approximately $-150°$ C. No reaction is observed. However, when this mixture evaporates to approximately one-third of its original volume and the temperature rises, a violent reaction occurs, in the course of which several grams of polymer having a viscosity of 108.4 S. S. U. at 210° F. are formed.

The narrow molecular weight distribution of the polymeric products obtained by the process of the present invention and their properties, e. g., their viscosity, render them suitable for a variety of important applications, viz., as automotive lubricants, hydraulic oils, transformer oils, specialty lubricants, etc.

Furthermore, by suitable provisions for the release of pressure on the reactor, it becomes possible to remove the heat of polymerization and to provide for self-refrigeration of the process system by withdrawing sulfur dioxide vapors, recondensing them and recirculating the condensate to the reactor in appropriate apparatus.

Neither the conditions nor the amounts disclosed in the above examples are to be understood as limiting the scope and the spirit of the present invention, which includes various modi-

We claim:

1. A process of manufacturing polypropylenes which comprises polymerizing propylene by contacting a liquid sulfur dioxide solution of propylene with boron fluoride catalyst, forming during said polymerization a separate oily polypropylene phase insoluble in liquid sulfur dioxide, separating the oil phase from the liquid sulfur dioxide phase and withdrawing the two phases from the polymerization zone, while maintaining sulfur dioxide in liquid phase, and recovering the polymer from said oil phase.

2. A process of manufacturing isobutylene polymers which comprises polymerizing isobutylene by contacting a liquid sulfur dioxide solution of said isobutylene with aluminum chloride, forming during said polymerization a separate oily polymer phase insoluble in liquid sulfur dioxide, separating the oil phase from the liquid sulfur dioxide phase and withdrawing the two phases from the polymerization zone, while maintaining sulfur dioxide in liquid phase, and recovering the polymer from said oil phase.

3. A process of manufacturing hydrocarbon polymers which comprises forming a solution of a normally gaseous mono-olefin in sulfur dioxide, introducing a stream of gaseous boron fluoride catalyst into said solution, causing formation of an oil phase containing a sulfur dioxide insoluble polymer, separating said oil phase from the liquid sulfur dioxide phase and withdrawing the two phases from the polymerization zone, while maintaining sulfur dioxide in liquid phase, recovering said sulfur dioxide insoluble polymer from said separated oil phase, separating sulfur dioxide soluble polymers from sulfur dioxide by fractional distillation, and recycling thus purified sulfur dioxide to the polymerization zone.

4. A process of manufacturing polypropylene which comprises forming a solution of propylene in liquid sulfur dioxide, introducing a stream of gaseous boron fluoride into said solution, causing formation of an oily polypropylene phase insoluble in sulfur dioxide, separating said oily phase from the liquid sulfur dioxide phase and withdrawing the two phases from the polymerization zone, while maintaining sulfur dioxide in liquid phase, recovering polypropylene from the separated oily phase, and recycling separated sulfur dioxide to the polymerization zone.

5. A process of manufacturing polybutylenes which comprises forming a solution of a butylene in liquid sulfur dioxide, introducing a stream of gaseous boron fluoride into said solution, causing formation of an oily polybutylene phase insoluble in sulfur dioxide, separating said oily phase from liquid sulfur dioxide phase and withdrawing the two phases from the polymerization zone, while maintaining sulfur dioxide in liquid phase, recovering polybutylenes from the separated oily phase and recycling separated liquid sulfur dioxide to the polymerization zone.

6. A process of manufacturing hydrocarbon polymer which comprises forming a solution of a mono-olefin containing not more than ten carbon atoms in liquid sulfur dioxide, catalyzing polymerization of said olefin in said solution by incorporating a halide polymerization catalyst capable of forming a coordination compound with liquid sulfur dioxide, forming a sulfur dioxide-insoluble hydrocarbon polymer phase by said polymerization, separating said two phases and removing one from the other while maintaining said sulfur dioxide in said liquid phase state, and recovering polymer from said separated sulfur dioxide-insoluble polymer phase.

7. A process as defined in claim 6 wherein said catalyst is boron fluoride.

8. A process as defined in claim 6 wherein said mono-olefin comprises a normal olefin and said catalyst is boron fluoride.

9. A process as defined in claim 6 wherein said mono-olefin is a normally gaseous olefin and said catalyst is boron fluoride.

10. A process as defined in claim 6 wherein said mono-olefin comprises propylene and said catalyst is boron fluoride.

11. A process as defined in claim 6 wherein said mono-olefin comprises a butylene.

12. A process as defined in claim 6 wherein said mono-olefin comprises a normally gaseous normal olefin, said catalyst is boron fluoride and said polymerization is at a temperature of from about −10° F. to about −100° F.

13. A process of manufacturing isobutylene polymers which comprises polymerizing isobutylene by contacting a liquid sulfur dioxide solution of said isobutylene with an acid-acting metal halide salt capable of forming a coordination compound with liquid sulfur dioxide, forming during said polymerization a separate oily polymer phase insoluble in liquid sulfur dioxide, separating the oil phase from the liquid sulfur dioxide phase and withdrawing the two phases from the polymerization zone, while maintaining sulfur dioxide in liquid phase, and recovering the polymer from said separated oil phase.

WILLIAM E. ELWELL.
RICHARD L. MEIER.

REFERENCES CITED

The following references are of record in the file of this patent:

UNITED STATES PATENTS

| Number | Name | Date |
|---|---|---|
| 2,229,661 | Mann, Jr. | Jan. 28, 1941 |
| 2,244,512 | Brandt | June 3, 1941 |
| 2,245,721 | Ross et al. | June 17, 1941 |
| 2,274,749 | Smyers | Mar. 3, 1942 |